United States Patent [19]

Rembold et al.

[11] Patent Number: 4,646,976

[45] Date of Patent: Mar. 3, 1987

[54] MAGNETIC VALVE, IN PARTICULAR A FUEL QUANTITY CONTROL VALVE

[75] Inventors: Helmut Rembold, Stuttgart; Walter Teegen, Waiblingen, both of Fed. Rep. of Germany

[73] Assignee: Robert Bosch GmbH, Stuttgart, Fed. Rep. of Germany

[21] Appl. No.: 828,811

[22] Filed: Feb. 12, 1986

[30] Foreign Application Priority Data

Mar. 21, 1985 [DE] Fed. Rep. of Germany ....... 3510222

[51] Int. Cl.[4] ...................... F02M 51/06; F16K 31/06

[52] U.S. Cl. ...................................... 239/585; 251/52; 251/129.16; 251/129.02

[58] Field of Search ....................... 251/129.02, 129.15, 251/129.16, 50–52; 239/585, 533.3–533.12

[56] References Cited

U.S. PATENT DOCUMENTS

| | | | |
|---|---|---|---|
| 1,459,460 | 6/1923 | Yardley | 251/52 |
| 4,157,168 | 6/1979 | Schlagmuller et al. | 251/129.02 X |
| 4,475,690 | 10/1984 | Hascher-Reichl et al. | 239/585 |
| 4,575,008 | 3/1986 | Kaczynski | 239/585 X |

FOREIGN PATENT DOCUMENTS

| | | | |
|---|---|---|---|
| 611619 | 11/1948 | United Kingdom | 251/52 |
| 2086473 | 5/1982 | United Kingdom | 239/533.3 |

*Primary Examiner*—Andres Kashnikow
*Attorney, Agent, or Firm*—Edwin E. Greigg

[57] ABSTRACT

A magnetic valve, in particular a fuel metering valve for fuel injection systems of internal combustion engines, is proposed which serves to measure the injection quantity and control the instant of injection. In a valve housing, the magnetic valve has an electromagnet and a valve closing element actuated thereby, which cooperates with a fixed valve seat. To damp the opening movement of the valve closing element against a fixed stop and to keep the hydraulic forces of adhesion between the valve closing element and the stop low, a damping chamber that is open toward the valve closing element is disposed on the stop. As the valve closing element approaches, fluid is positively displaced out of the damping chamber in the form of a squish flow between the stop face and the head element of the valve closing element, so that recoiling is avoided due to thus-generated damping. As the valve closing element lifts, fluid can flow through a throttle bore or a check valve into the damping chamber, so that release of the valve closing element from the stop face can be effected with little force being exerted.

17 Claims, 3 Drawing Figures

MAGNETIC VALVE, IN PARTICULAR A FUEL QUANTITY CONTROL VALVE

BACKGROUND OF THE INVENTION

The invention is based on a magnetic valve as defined generally hereinafter. A magnetic valve of this type is known from German Offenlegungsschrift No. 31 39 669, for instance, in which when the valve opens, the disk-like stop portion of the valve closing member comes to rest on an annular bead on the fixed stop. At a high opening speed, the valve closing member hits the annular bead hard, causing recoiling that interferes with the flow of fluid. Forces of hydraulic adhesion, which vary from one valve to another, are also present when the closing movement is initiated. Recoiling and adhesion forces, however, have a very unfavorable effect on the switching times of the valve from stroke to stroke and from one valve to another. This is particularly disadvantageous when such a valve is used for the metering of fuel that is done upon each injection stroke of a fuel injection pump, or each fuel supply cycle, and impairs the accuracy of metering that is required.

OBJECT AND SUMMARY OF THE INVENTION

The magnetic valve according to the invention has the advantage over the prior art that the squish flow in the opening gap between the damping chamber and the closing surface effects a damping of the opening movement of the valve closing member, and that the forces of adhesion when the damping chamber is reopened are very slight. It has also proved to be advantageous that because of the narrow stop face of the damping chamber, the function of the magnetic valve is much less temperature-dependent than is the case with known magnetic valves, because a turbulent squish flow arises in the damping gap when the damping chamber is closed.

A particularly advantageous feature of the invention provides that the damping chamber be ventilated by a throttle, so that when the damping chamber is opened when the valve closing member rises, the fluid can flow into it without an undesirable throttling effect being present. This action can be still further improved if a check valve preferably being located in the fixed stop is provided for the ventilation.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
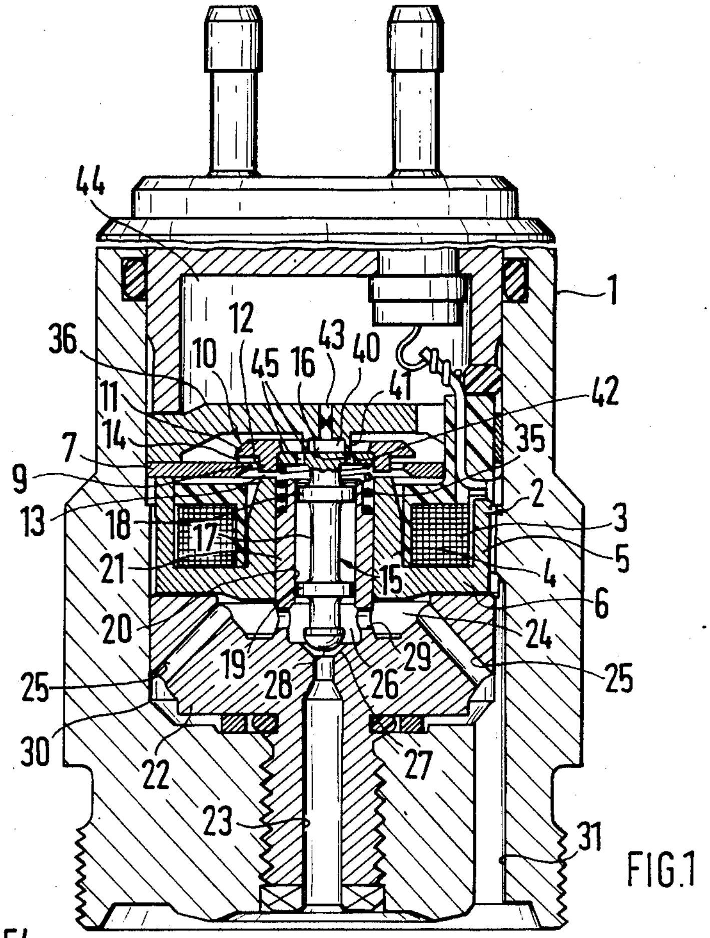
FIG. 1 is a longitudinal cross section of a first exemplary embodiment of a magnetic valve according to the invention.

The magnetic valve has a valve housing 1, in which a core 2 of ferromagnetic material is inserted; the core carries a magnetic coil 3 between an inner cylinder 4 and an outer cylinder 5. The inner cylinder 4 and outer cylinder 5 are joined together by a yoke 6 in a magnetically conductive manner. A magnetically conductive yoke plate 7 substantially covers the outer cylinder 5 and the magnetic coil 3. The magnetic circuit that is interrupted between the inner cylinder 4 and the plate 7, which is perforated, is bridged by an armature 10. The armature 10 has a plate-like part 11, which merges with a hollow cylindrical collar 12, which faces the end face of the inner cylinder 4 and extends through an opening 9 in the plate 7. A first air gap 13 is located between the collar 12 and the inner cylinder 4. Remote from the inner cylinder 4, the plate-like part 11 of the armature 10 protrudes out beyond the plate 7 and with it forms a second air gap 14. A valve closing element 15 of nonmagnetic material, which has a disk-shaped armature head 16 and a stem 17, is pressfitted along with the armature head 16 into the collar 12 of the armature 10. Two guide collars or annular rings 18, 19 guide the valve closing element 15 in a cylinder bore 20 of a guide bushing 21. The guide bushing 21 is part of a valve seat body 22, which has an inflow bore 23 in an extension of the cylinder bore 20. A hollow chamber 24, in which outflow bores 25 begin, is defined by the yoke 6 and valve seat body 22. Between the inflow bore 23 and an annular chamber 26, a conical valve seat 27 is formed in the valve seat body 22. A hemispherical closing body 28 of the valve closing element 15 cooperates with the conical valve seat 27. Bores 29 in the guide bushing 21 join the hollow chamber 24 and the annular chamber 26. The outflow bores 25 lead via an intermediate chamber 30 to a return flow conduit 31 in the valve housing 1. A restoring spring 35 is supported in the upper portion of the guide bushing 21, resting with its upper end on the lower surface of the armature head 16 of the valve closing element 15; in the non-excited state of the magnetic coil 3 this spring 35 lifts the valve closing member 15 from the valve seat 27 and presses it toward a stop plate 36 that is fixed above the armature 10 and the plate 7, so that the magnetic valve is in the open position.

In the magnetic valve, fluid, especially fuel in liquid form, is delivered at high pressure to the inflow bore 23, which communicates with the pressure chamber of a fuel feed pump of a fuel injection system for internal combustion engines. Contrarily, the return flow conduit 31 communicates with the low-pressure intake side of the fuel feed pump.

In order to damp the impact of the valve closing element 15 on the stop plate 36 when the magnetic valve is opening and thereby avoid recoiling, damping chamber 40 that is open toward the disk-shaped armature head 16 is disposed on the stop plate 36. The ceiling of the damping chamber 40 is embodied by the plate itself, and the side wall is embodied by an offstanding annular collar 41, pointing downward from the stop plate 36. The wall thickness of the annular collar 41 is very slight, so that the annular stop face 42 which engages the armature head 16, is very narrow. The stop face 42 is preferably rounded, so as to keep the forces of hydraulic adhesion low when the armature head 16 is raised from the stop face 42.

To prevent undesirable negative pressure from arising in the chamber 40 upon the closure of the magnetic valve by a movement of the valve closing element 15 toward the valve seat 27 as the armature head 15 lifts away from the annular collar 41, this chamber 40 communicates via a throttle bore 43 in the stop plate 36 with the chamber 44 above the stop plate 36, which is also at low pressure. The throttle bore 43 is dimensioned such that when the armature head 16 strikes the stop face 42 of the annular collar 41, the flow-through quantity is negligibly small, so that on the one hand a damping action of the damping chamber 40 is present, yet when the armature head 16 lifts from the annular collar 41, fluid can still flow out of the chamber 44 into the damping chamber 40. Despite this throttle bore 43, a damping action of the damping chamber 40 is assured, since before impact on the annular collar 41 the valve closing element 15 is at a high speed, but when it is rising from its seat it is at a low speed.

It should also be noted that instead of the throttle bore 43 in the stop plate 36, a throttle in the form of a fine conduit can also be provided, to the same effect, in the stop face 42 of the annular collar 41 or in the surface of the armature head 16 that comes into contact with the annular collar.

In order also to prevent movement-inhibiting forces from arising on the armature 10, which has a large surface area, and on the armature head 16 during the displacement movement of the valve closing element 15, a plurality of openings 45 through which the positively displaced fluid can flow are distributed uniformly in the armature head 16. The disposition of these openings 45 is preferably such that they coincide with the radially outer part of the stop face 42 of the annular collar 41. The result is a further reduction of hydraulic adhesion as the armature head lifts up.

The above-described magnetic valve functions as follows:

When no current is traveling through the magnetic coil 3, the restoring spring 35 urges the valve closing member 15 upward, so that its armature head 16 rests on the stop face 42 of the annular collar 41 (FIG. 1). In this position, the closing body 28 of the valve closing element 15 is raised away from the valve seat body 22. Fluid delivered into the inflow bore 23 can flow past the closing body 28 into the annular chamber 26, and from there to the low-pressure portion through the bores 29, the hollow chamber 24, the outflow bores 25, the intermediate chamber 30 and the conduit 31.

Upon excitation of the magnetic coil 3, the armature 10 that is joined with the valve closing element 15 is attracted downwardly, so that finally the closing body 28 is pressed onto the valve seat 27, which prevents the flow therethrough of fluid. In the initial phase of the closing movement of the valve closing element, fluid is drawn into the damping chamber 40 from the chamber 44 through the throttle bore 43, so that it is possible for the armature head 16 to rise from the stop face 42 without exerting a great amount of force. Since the stop face 42 is furthermore very narrow, the only forces of adhesion that arise and must be overcome are small. During the lifting operation, fluid flows upwardly from the space below the armature head 16 through the openings 45, so that the resistance is low.

The magnetic valve opens once again whenever the pressure is to be reduced in the pressure chamber of the associated fuel feed pump. To this end, the current circuit to the magnetic coil 3 is broken once again, with the effect that the retaining force of the core 2 disappears. Under the influence of the restoring spring 35 and of the high fluid pressure in the inflow bore 23 that acts upon the closing body 28, the valve closing element 15 is displaced upwardly at a relatively high speed. In so doing, and especially shortly before the armature head 16 strikes the stop face 42 of the annular collar 41, a squish flow arises between the stop face 42 and the annular area coinciding with it at the top of the armature head, this flow coming from the damping chamber 40 and the space below that coincides therewith. As a result of the thus positively-displaced fluid, which escapes in the form of a squish flow, the speed of the valve closing element 15 is damped as the armature head 16 approaches the stop face 42. Since the speed is relatively high, and relatively much fluid is positively displaced, the throttle bore 43 operates with high resistance.

Figure 2:
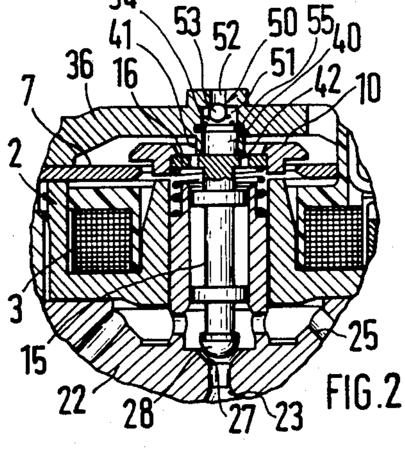
FIG. 2 is a detailed cross section showing the portion essential to the invention of a second exemplary embodiment in longitudinal section.
Figure 3:
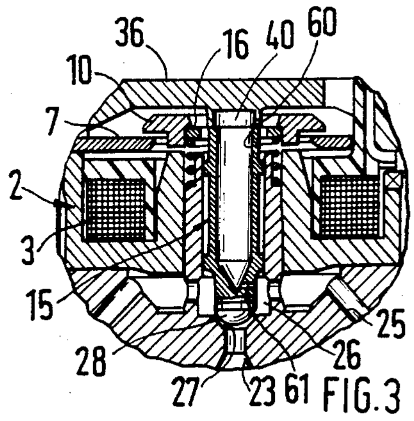
FIG. 3 is a detailed cross section, again in longitudinal section, showing the portion essential to the invention of a third exemplary embodiment.

The two exemplary embodiments according to FIGS. 2 and 3 are modified, as compared with the embodiment described above in conjunction with FIG. 1, only in terms of the damping device. The same reference numerals are therefore used for elements that are the same and have the same function.

In the exemplary embodiment of FIG. 2, instead of a throttle bore 43, a check valve 50 is provided for ventilating the damping chamber 40. The check valve 50 allows a flow of fluid from the upper chamber 44 into the damping chamber 40 but prevents a flow in the other direction. To this end, the check valve 50 comprises a recess 51, coinciding with the damping chamber 40, and an opening 52 coaxial therewith having a smaller diameter, as well as a ball 53 that rests against the opening 52 in the recess 51. The ball 53 is pressed by a conical compression spring 54 against the seat at the transition between the recess 51 and the opening 52. The compression spring 54 is supported on a snap ring 55. The check valve 50 has the advantage that when the armature head 16 lifts from the stop face 42, fluid can flow out of the chamber 44 into the damping chamber 40 without resistance, while contrarily when the armature head 16 approaches as the magnetic valve opens, no fluid can flow out of the damping chamber 40 into the chamber 44; instead, as described above, positively displaced fluid is used for damping the approaching movement.

In the exemplary embodiment of FIG. 3, the damping chamber 40 is enlarged by providing that the valve closing element 15 has a blind bore 60 that is open at the top. Instead of a throttle bore 43 in the stop plate 36, as shown in FIG. 1, a throttle bore 61 is disposed in the lower portion of the valve closing element 15, thereby joining the blind bore 60 with the annular chamber 26. When the magnetic valve opens because of an upward movement of the valve closing element 15, the quantity of fluid in the blind bore 60 is accelerated. As the armature head 16 approaches the stop face 42 of the annular collar 41, the result is initially a backpressure, having the effect that in comparison with the embodiment of FIG. 1 less fluid can drain out via the throttle bore 61, which correspondingly increases the damping effect.

It is additionally noted that the damping chamber and its narrow stop face can be disposed on the valve closing element 15 or on its armature head 16, instead of on the stop face 36, with the same effect and the same advantages as those of the above-described exemplary embodiments.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic valve for a fuel injection system of an internal combustion engine, said valve having a valve housing (1), a conductor coil (3) mounted on a core (2) of ferro-magnetic material in said housing, an armature (10) carrying a movable valve closing element (15), said movable valve closing element having a stop element (16) and a closing element (28) cooperating with a valve seat (27), said armature (10) being adapted to press said valve closing element (15) on said valve seat (27) upon said conductor coil (3) being actuated, said valve housing further having a stop plate (36) provided with a stop face (42) against which the stop element (16) comes to rest in an open position of said movable valve closing element, said stop plate (36) further including an off-standing thin-walled annular collar (41) projecting toward said armature, said stop face (42) being defined by an end face of said annular collar (41), said annular collar (41) further defining a ventilatable damping chamber (40) sealable by contact of said stop element (16) on said stop face (42), whereby turbulent squish flows and adverse forces of hydraulic adhesion in fuel that occur during the opening and closing of the damping chamber can be reduced.

2. A magnetic valve as defined by claim 1, in which said stop face provided on an end face of said annular collar is rounded.

3. A magnetic valve as defined by claim 2, in which said ventilatable damping chamber is vented via a throttle means.

4. A magnetic valve as defined by claim 3, in which said stop element includes plate means, said plate means further including means defining openings which are disposed radially so as to be in proximity to a circumference of said annular collar when said stop element comes to rest against said stop face.

5. A magnetic valve as defined by claim 4, in which said means defining said openings partially overlap a radially extending outer region of said stop face of said ventilatable damping chamber.

6. A magnetic valve as defined by claim 2, in which said damping chamber is ventilatable via a check valve.

7. A magnetic valve as defined by claim 2, in which said stop element includes plate means, said plate means further including means defining openings which are disposed radially so as to be in proximity to a circumference of said annular collar when said stop element comes to rest against said stop face.

8. A magnetic valve as defined by claim 7, in which said means defining said openings (45) partially overlap a radially extending outer region of said stop face of said ventilatable damping chamber.

9. A magnetic valve as defined by claim 1, in which said ventilatable damping chamber is vented via a throttle means.

10. A magnetic valve as defined by claim 9, in which said throttle means is disposed in said stop plate.

11. A magnetic valve as defined by claim 9, in which said throttle means is disposed in said valve closing element.

12. A magnetic valve as defined by claim 9, in which said stop element includes plate means, said plate means further including means defining openings which are disposed radially so as to be in proximity to a circumference of said annular collar when said stop element comes to rest against said stop face.

13. A magnetic valve as defined by claim 12, in which said means defining said openings partially overlap a radially extending outer region of said stop face of said ventilatable damping chamber.

14. A magnetic valve as defined by claim 1, in which said damping chamber is ventilatable via a check valve.

15. A magnetic valve as defined by claim 14, in which said check valve is disposed in said stop plate.

16. A magnetic valve as defined by claim 1, in which said stop element includes plate means, said plate means further including means defining openings which are disposed radially so as to be in proximity to a circumference of said annular collar when said stop element comes to rest against said stop face.

17. A magnetic valve as defined by claim 26, in which said means defining said openings partially overlap a radially extending outer region of said stop face of said ventilatable damping chamber.

* * * * *